(12) United States Patent
Yang (10) Patent No.: US 8,120,485 B2
(45) Date of Patent: Feb. 21, 2012

(54) ARTICLES CONTAINING CHIPLESS RADIO FREQUENCY IDENTIFICATION ELEMENTS

(75) Inventor: Tahua Yang, Woodridge, IL (US)

(73) Assignee: Abbott Laboratories, Abbott Park, IL (US)

(*) Notice: Subject to any disclaimer, the term of this patent is extended or adjusted under 35 U.S.C. 154(b) by 770 days.

(21) Appl. No.: 11/960,223

(22) Filed: Dec. 19, 2007

(65) Prior Publication Data

US 2009/0160654 A1    Jun. 25, 2009

(51) Int. Cl.
G08B 13/18    (2006.01)

(52) U.S. Cl. ............... 340/572.1; 340/572.5; 340/572.6; 340/10.1; 235/375; 235/385; 235/492

(58) Field of Classification Search ............... 340/572.1, 340/572.5, 10.1; 235/375, 385, 451, 492
See application file for complete search history.

(56) References Cited

U.S. PATENT DOCUMENTS

| | | | |
|---|---|---|---|
| 4,438,520 A | 3/1984 | Saltzer | |
| 5,381,137 A | 1/1995 | Ghaem et al. | |
| 5,581,257 A * | 12/1996 | Greene et al. | 342/51 |
| 6,471,878 B1 * | 10/2002 | Greene et al. | 216/13 |
| 6,547,140 B2 | 4/2003 | Marchand | |
| 6,708,881 B2 | 3/2004 | Hartmann | |
| 6,819,244 B2 | 11/2004 | Dukler et al. | |
| 6,966,493 B2 | 11/2005 | Hartmann | |
| 6,997,388 B2 | 2/2006 | Yogev et al. | |
| 7,055,691 B2 * | 6/2006 | Safian | 206/459.5 |
| 7,075,434 B2 | 7/2006 | Shafir | |
| 7,180,304 B2 | 2/2007 | Grishin et al. | |
| 7,205,774 B2 | 4/2007 | Grishin et al. | |
| 7,221,168 B2 | 5/2007 | Grishin et al. | |
| 7,468,161 B2 * | 12/2008 | Reinhardt et al. | 422/63 |
| 7,506,813 B2 * | 3/2009 | Christofferson et al. | 235/451 |
| 7,845,375 B2 * | 12/2010 | Dorney | 141/94 |
| 2003/0194052 A1 * | 10/2003 | Price et al. | 378/45 |
| 2005/0127090 A1 * | 6/2005 | Sayers et al. | 222/1 |
| 2005/0189255 A1 | 9/2005 | Safian | |
| 2006/0030049 A1 | 2/2006 | Bhimani et al. | |

(Continued)

FOREIGN PATENT DOCUMENTS

EP    1065623 A2    1/2001

(Continued)

OTHER PUBLICATIONS

Andrews, James R., "Deconvolution of System Impulse Responses and Time Domain Waveforms", Picosecond Pulse Labs, Boulder, Colorado. AN-30418, Revision 1 (Nov. 2004), pp. 1-6.

(Continued)

Primary Examiner — George Bugg
Assistant Examiner — Anne Lai
(74) Attorney, Agent, or Firm — Timothy P. Lucier (57) ABSTRACT

A container comprising a body having embedded therein a plurality of chipless radio frequency identification elements. The chipless radio frequency identification elements comprise a plurality of categories of resonant elements. The resonant elements can be utilized in a system having a binary code feature. The combination of different resonant elements can be read and translated to identify the features of a particular product. The container can be prepared by compounding moldable compositions with the resonant elements and molding the moldable compositions containing the resonant elements into the final product. The invention also provides a system and a method for reading the binary code provided by the chipless radio frequency identification elements.

8 Claims, 8 Drawing Sheets

U.S. PATENT DOCUMENTS

| | | |
|---|---|---|
| 2006/0202830 A1 | 9/2006 | Scharfeld et al. |
| 2006/0220853 A1 | 10/2006 | Shafir |
| 2007/0005367 A1 | 1/2007 | DeJean et al. |

FOREIGN PATENT DOCUMENTS

| | | |
|---|---|---|
| WO | 2005040001 A1 | 5/2005 |
| WO | 2006093448 A1 | 9/2006 |

OTHER PUBLICATIONS

CrossID is an innovative printable (liquid) automatic identification technology similar in application to Bar Code method, but using radio frequency and resonances instead of optical signals. Communication Materials [online]. Cross ID Corporation 2002-2003 [retrieved on May 9, 2007] Retrieved from the Internet: <URL: http://crossid.innovya.com/technology.php>, pp. 1-6.

Jones, K.C., Invisible Tattoo Ink for Chipless RFID safe, company says. News Article [online]. EE Times Europe, Jan. 10, 2007 [retrieved on May 9, 2007] Retrieved from the Internet: <URL: http://www.eetimes.eu/industrial/196900063>.

Lopresti, Daniel et al., Chipless ID for Paper Documents. Technical Report LU-CSE-05-010 [online]. Department of Computer Science and Engineering, Lehigh University, Bethlehem, PA 18015, Jan. 2005 [retrieved on May 9, 2007] Retrieved from the internet: <URL: http://www3.lehigh.edu/images/userimages/jgs2/Page_3813/LU-CSE-05-010.pdf>, pp. 1-11.

Medical Device Link, Tapemark Announces New Chipless RFID for Brand Protection. Press Release [online]. The Tapemark Company, West Saint Paul, MN, Mar. 9, 2004 [retrieved on May 9, 2007] Retrieved from the internet: <URL: http://www.devicelink.com/press_release/mdl/tapemark.html>.

Injection Molding Machine. Encyclopedia [online]. Plastics Wiki [retrieved on Dec. 13, 2007] Retrieved from the internet: <URL: http://Plastics.inwiki.org/injection_molding_machine>, pp. 1-4.

Firewall Protection for Paper Documents. Article [online]. RFID Journal, Feb. 11, 2004 [retrieved on May 9, 2007] Retrieved from the internet: <URL: http://www.rfidjournal.com/article/articleview/790/1/44/>, pp. 1-2.

Tobias, Randall D., An Introduction to Partial Least Squares Regression. Papers [online]. SAS Institute Inc., Cary, NC [retrieved on May 9, 2007] Retrieved from the Internet: <URL: http://support.sas.com/rnd/app/papers/pls.pdf>, pp. 1-8.

* cited by examiner

ARTICLES CONTAINING CHIPLESS RADIO FREQUENCY IDENTIFICATION ELEMENTS

BACKGROUND OF THE INVENTION

1. Field of the Invention

This invention relates to radio frequency identification, more particularly, articles containing chipless radio frequency identification elements.

2. Discussion of the Art

Currently, in the area of medical diagnostics, identification of containers is generally effected by bar code labels. Bar code labels require printing onto or application onto the surface of the container. Bar code labels require an unobstructed optical path to be read, which generates design challenges for both the container and the bar code readers. The bar code label is required to be clear, i.e., the print quality must be satisfactory and the label must be clear of foreign material, such as frost resulting from humidity and storage at low temperatures. Bar code labels generally have only a limited quantity of space, with the result that the information that can be written on a bar code label is extremely limited. Bar code labels can be removed and reused, thereby leading to counterfeiting issues. Bar code labels can delaminate from the containers on account of condensation of water or low temperatures.

In the area of medical diagnostics, identification of containers by means of radio frequency identification tags and data capturing systems utilizing radio frequency identification tags can be used in order to comply with Food and Drug Administration (FDA) regulations for management of supply chains.

Figure 1:
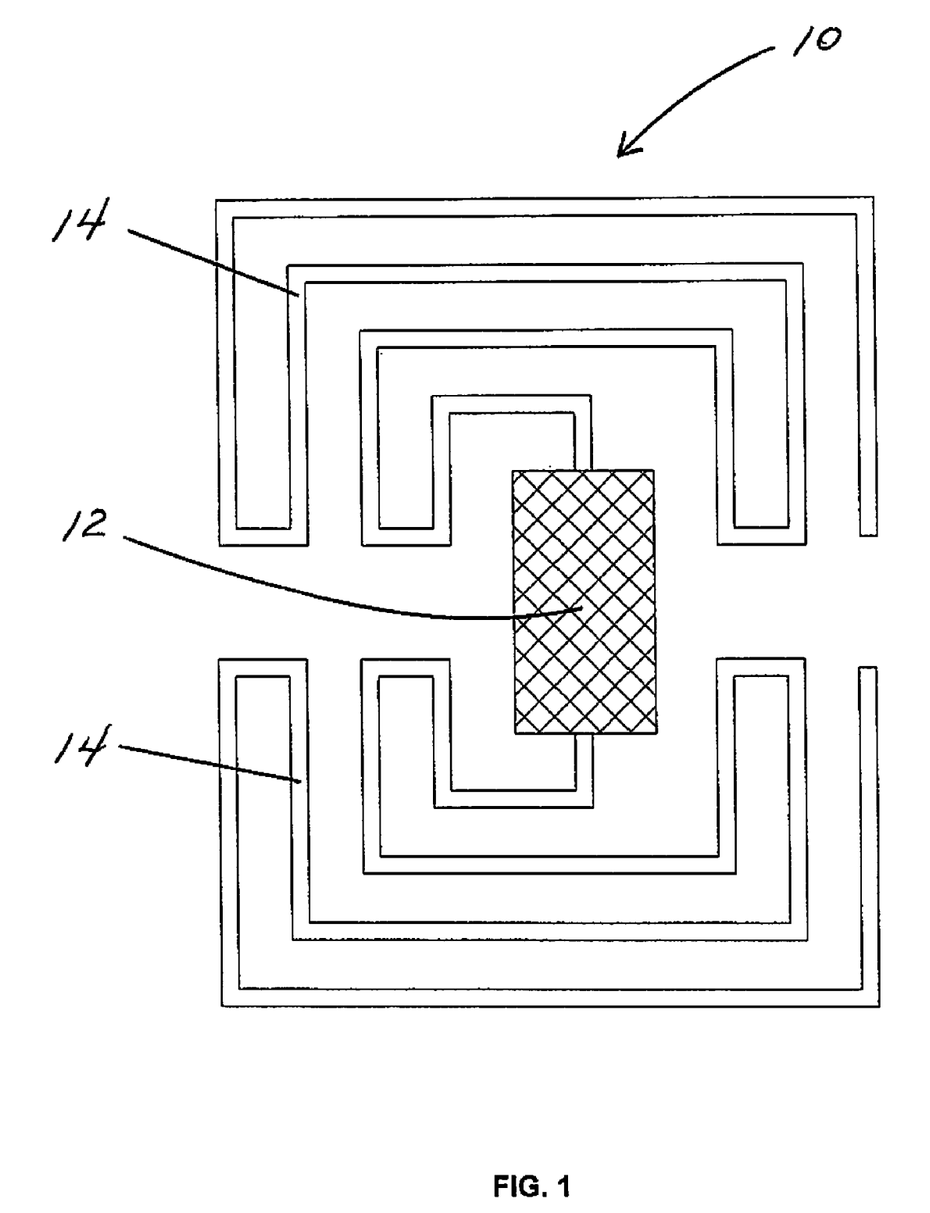
FIG. 1 is a schematic diagram of a radio frequency identification tag showing a microchip attached to an antenna.

Radio frequency identification tags can be categorized as active, semi-passive, and passive radio frequency identification tags. The main difference between the three types of radio frequency identification tags resides in the nature of the power supply. The passive radio frequency identification tag does not require any installed power source. The passive radio frequency identification tags contain a microchip and an antenna. The minute electrical current induced in the antenna by an incoming radio frequency signal provides sufficient power to cause the microchip to transmit a response. FIG. 1 illustrates a typical radio frequency identification tag that has a microchip and an antenna.

Currently available radio frequency identification tags are not suitable for common diagnostic products on account of size and orientation requirements. Containers for diagnostic reagents and other disposable products are often small in size. The size of a radio frequency identification tag is limited by the size of the antenna. A commercially available radio frequency identification tag manufactured by Avery Dennison is as small as 1 inch by 1 inch. The liquid contained in reagent containers and metal in proximity to reagent containers can cause interference with radio frequency signals. Signal receiving and backscattering are dependent upon direction; accordingly, the placement of radio frequency identification tags on an object is critical. The most critical obstacle for utilizing radio frequency identification tags is high cost. The cost of microchips associated with radio frequency identification tags is high relative to the cost of typical diagnostic products.

Microchips are expensive, unless they can be mass-produced. Finally, the scrap rate of radio frequency identification tag assembly is high on account of the difficulty inherent in the placement of a chip on the antenna contacts. U.S. Patent Application Serial No. 2006/0202830 discloses a blister package with an integrated radio frequency identification tag. The conductive lidding material is modified to serve not only to seal some contents within some formed blister film, but also to act as a radio frequency identification antenna. An integrated circuit chip is electrically connected to the lidding film antenna. This patent also discloses methods for making such blister packages. This disclosure is limited to attaching a radio frequency identification tag to a film.

U.S. Patent Application Serial No. 2006/0030049 discloses a method of placing in a diagnostic system at least one cartridge containing a reservoir of reagent and carrying an identifier device that has information pertinent to the reagent in the reservoir. The diagnostic system automatically reads the information contained in the identifier device and used the information to control the diagnostic system in dispensing the reagent. The information contained in the device may consist of one or more of an identification of the reagent in the reservoir; the expiration date of the reagent; the active shelf life of the reagent; the volume of the reagent in the reservoir; an identification of the origin of the reagent; and the maximum storage temperature of the reagent. Iris Diagnostics integrates an authentication system based on radio frequency identification into the iQ200 Urinalysis system.

U.S. Pat. No. 5,381,137 discloses a system utilizing radio frequency identification tags having a plurality of resonant circuits. When the radio frequency identification tag enters a detection zone, the system determines the resonant frequency of each of the resonant circuits and produces a corresponding code that identifies a tagged article. This system requires a plurality of circuits to be built into a radio frequency identification tag, which increases the manufacturing cost. Special focused beam antennas are preferred to locate the individual resonant circuits on the radio frequency identification tag. The complexity of the system causes this system to be costly.

U.S. Pat. No. 7,075,434 discloses a method for encoding a radio frequency identification tag with an n-bit binary code. One or more predetermined frequency sources are associated with the radio frequency identification tag. The radio frequency identification tag produces known different respective characteristic frequencies, each of which is associated with a known unique position in the n-bit binary code. The patent fails to disclose how to resolve the detected multiple frequencies and method of matching the corresponding code. The decoding process relies upon band-pass filters to identify multiple frequency resonant elements. The band-pass filter approach cannot differentiate those resonant elements that have small differences in their resonant frequencies. The scattering approach of the detection is limited to higher frequency ranges (915 MHz and 2.45 GHz).

U.S. Patent Application Serial No. 2007/0005367 describes a scattering agent attached to an object to provide a reproducible radio frequency fingerprint that can be used to authenticate a tag or seal for the object. The radio frequency fingerprint is measured and digitized, combined with information associated with the object to which a radio frequency certificate of authenticity is attached, and stored in a radio frequency identification system associated with the radio frequency certificate of authenticity. A scanner receives the fingerprint and the information and authenticates the information by comparing the fingerprint against a new fingerprint obtained from the object. Only one category of scattering agent is used and a three-dimensional arrangement is relied on to generate a fingerprint. The cost of generating a database for later authentication is expensive.

U.S. Pat. Nos. 7,180,304; 7,205,774; and 7,221,168 disclose microwave readable barcode formed from a pattern of dielectric material printed on the surface of an article. The barcodes need to be printed and are subject to wear and alteration.

U.S. Pat. Nos. 6,708,881 and 6,966,493 disclose surface acoustic wave identification tags and methods of operating and identifying the tag. The tag includes (1) a piezoelectric substrate having a surface acoustic wave transducer located thereon, (2) a group of slots arranged by both pulse position and phase position on the substrate; and (3) a number of reflectors distributed among the slots such that the reflectors encode a number by both pulse position and phase position. The tag is made of a piezoelectric material. The manufacturing cost for the disclosed features is high.

U.S. Pat. No. 6,997,388 discloses radio frequency data carrier having at least one diffraction element. The radio frequency data carrier comprises at least one diffraction element that has a dimension of the order of a wavelength of radio frequency radiation and is responsive to radio frequency irradiation, the response produced by the diffraction elements in the data carrier being indicative of machine-readable data carried by the data carrier. The diffraction element can be incorporated into an article. No decoding feature is mentioned.

It would be desirable to have a product identification system that is a more versatile than a conventional barcode system. It would also be desirable to have a radio frequency identification system that can be prepared by an inexpensive method.

SUMMARY OF THE INVENTION

In one aspect, this invention provides a container comprising a body having embedded therein a plurality of chipless radio frequency identification elements. The chipless radio frequency identification elements comprises a plurality of categories of resonant elements.

The resonant elements can be utilized in a system having a binary code feature. The combination of different resonant elements can be read and translated to identify the features of a particular product.

The container can be prepared by compounding moldable compositions with the resonant elements and molding the moldable compositions containing the resonant elements into the final product.

In another aspect, this invention provides a system for employing radio frequency signals to identify a container and the contents thereof. In still another aspect, this invention provides a method for verifying information relating to the contents of a container.

The articles described herein have no limitation on size, no constraint on tag placement, and potentially low cost, as compared with conventional radio frequency identification tags.

DETAILED DESCRIPTION

As used herein, the expression "radio frequency identification", or RFID, is a generic term for technologies that use radio waves to automatically identify objects, such as, for example, containers for biological samples and containers for reagents for analyzing biological samples. The most common method of identification is to store a serial number that identifies the object, and perhaps other information relating to the object or contents thereof, on a microchip that is attached to an antenna. The microchip and the antenna together are called a radio frequency identification transponder or a radio frequency identification tag. The antenna enables the microchip to transmit the identification information and other information to a radio frequency identification reader. The radio frequency identification reader converts the radio waves reflected back from the radio frequency identification tag into digital information that can then be passed on to computers that can make use of it.

As used herein, the expression "radio frequency identification system" means a system comprising a radio frequency identification tag made up of a microchip with an antenna, and a radio frequency identification interrogator or radio frequency identification reader with an antenna. The radio frequency identification reader sends out electromagnetic waves. The tag antenna is tuned to receive these waves. A passive radio frequency identification tag draws power from the field created by the reader and uses it to power the circuits of the microchip. The microchip then modulates the waves that the passive radio frequency identification tag sends back to the radio frequency identification reader, which converts the waves received by the radio frequency identification reader into digital data.

As used herein, microchips in radio frequency identification tags can be "read-write microchips", "read-only microchips", or "write once, read many microchips." In the case of read-write microchips, information can be added to the radio frequency identification tag or existing information can be written over when the radio frequency identification tag is within range of a radio frequency identification reader. Read-write microchips usually have a serial number that cannot be written over. Additional blocks of data can be used to store additional information about the items to which the radio frequency identification tag is attached. These radio frequency identification tags can be locked to prevent overwriting of data or encrypted to prevent the disclosure of proprietary data or disclosure of data that would compromise the privacy of a patient. Read-only microchips have information stored on them during the manufacturing process. The information on them can never be changed. Write once, read many microchips have a serial number written to them once, and that information cannot be overwritten later.

As used herein, the expression "active radio frequency identification tags" have a transmitter and their own power source, typically a battery. The power source is used to run the microchip's circuitry and to broadcast a signal to a radio frequency identification reader. "Passive radio frequency identification tags" have no battery. Instead, passive radio frequency identification tags draw power from the radio frequency identification reader, which sends out electromagnetic waves that induce a current in the tag's antenna. "Semi-passive radio frequency identification tags" use a battery to run the microchip's circuitry, but communicate by drawing power from the radio frequency identification reader. Any of the foregoing types of radio frequency identification tags can be used in the system of this invention.

As used herein, the expression "resonant element" means an element that has a tendency to oscillate at maximum amplitude at a certain frequency. This frequency is known as the resonance frequency of the element. A resonance element, whether mechanical, acoustic, or electrical, will probably have more than one resonance frequency. It will be easy for the resonant element to vibrate at those frequencies and more difficult for the resonant element to vibrate at other frequencies. The resonant element will "pick out" its resonance frequency from a complex excitation, such as an impulse or a wideband noise excitation. In effect, the resonant element is filtering out all frequencies other than its resonance frequency.

As used herein, the term "antenna" means a device that is coupled to a microchip and that is capable of receiving and transmitting a signal.

As used herein, the expression "genetic code" means the identifying indicia that are embedded into a product when the product is manufactured. In the finished product described herein, the genetic code is compounded with the polymeric material that is used to form the finished product.

As used herein, the expression "randomly oriented" means aligned or positioned relative to a reference system in no specific pattern.

As used herein, the expression "chipless radio frequency identification element" means a radio frequency identification element that does not have microchip. Chipless radio frequency identification elements are cheaper, thinner, and more flexible than radio frequency identification tags that have microchip. They work over a wider temperature range and are less susceptible to electrical interference than are radio frequency identification tags that have a microchip. The chipless radio frequency identification elements have limited memory and no encryption.

As used herein, the term "backscatter" means the reflection of waves, particles, or signals back to the direction from which they came.

As used herein, the term "deconvolution" means a process, based on an algorithm, used to reverse the effects of convolution on recorded data. The concept of deconvolution is widely used in the techniques of signal processing and image processing. In general, the object of deconvolution is to find the solution of a convolution equation of the form $f*g=h$. Usually, h is some recorded signal, and f is some signal that is desired to be recovered, but has been convolved with some other signal prior to being recorded. The function g might represent the transfer function of an instrument or a driving force that was applied to a physical system. If g is known, then deterministic deconvolution can be performed. If g is not known in advance, then the values of g need to be estimated. Estimation is most often carried out using methods of statistical estimation.

Chipless radio frequency identification elements do not need microchips for storing information. Information storage relies on the antennas or resonant elements. The chipless radio frequency identification elements can be compounded as additive(s) into molding compositions. The compounded compositions, therefore, can carry their own genetic codes. Containers molded from these compositions for diagnostic applications can be read by radio frequency identification readers at a frequency of from about 100 KHz to about 10 GHz. It is preferred to operate in the low frequency (LF) range, such as, for example, 125 KHz to 134.2 KHz and in the high frequency (HF) range, such as, for example, 13.56 MHz, on account of the clinical laboratory environment. In the clinical laboratory environment, ultrahigh frequency (UHF) and microwave frequency are more susceptible to interference form liquid, dirt, metal than are LF and HF.

The chipless radio frequency identification elements embedded in the molded container are randomly oriented. For this reason, detection is not directional. In a typical radio frequency identification arrangement, the configuration of the microchip-antenna assembly is designed to intercept (or couple) the incoming electromagnetic waves. The electromagnetic waves are emitted by a radio frequency signal generator. The maximum electromagnetic signal intercepted by the antenna occurs when the antenna coil is aligned with the incoming electromagnetic wave. Orientation is even more critical for near field applications. The cost of the chipless radio frequency identification is low, because it does not contain a costly microchip and chip-antenna assembly. Because the chipless radio frequency identification elements are blended into the molding compositions, there is no issue with respect to the size of radio frequency identification tags to be adhered to the product.

Figure 2:
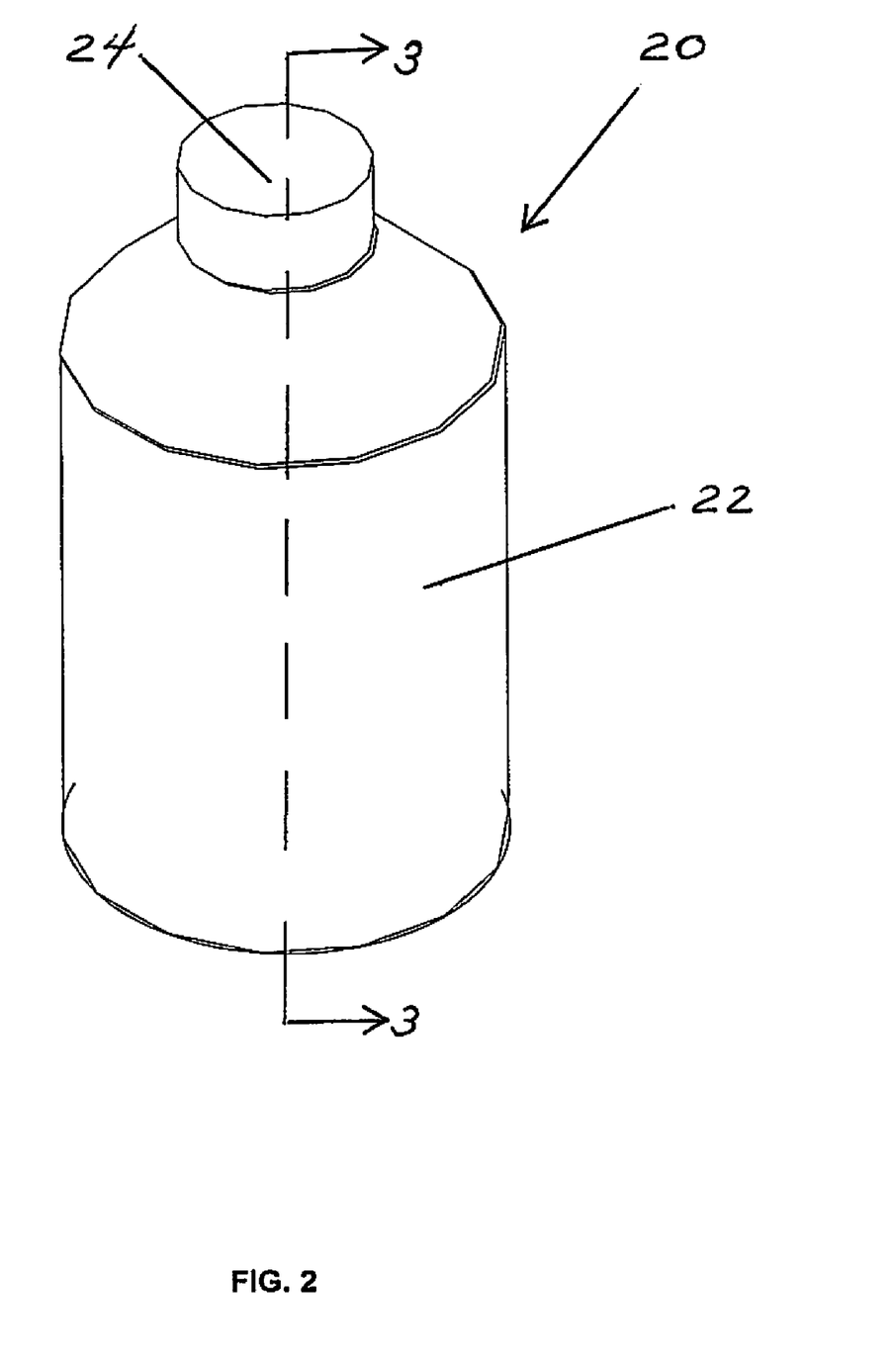
FIG. 2 is a perspective view of a container suitable for use with the chipless radio frequency identification element described herein.
Figure 3:
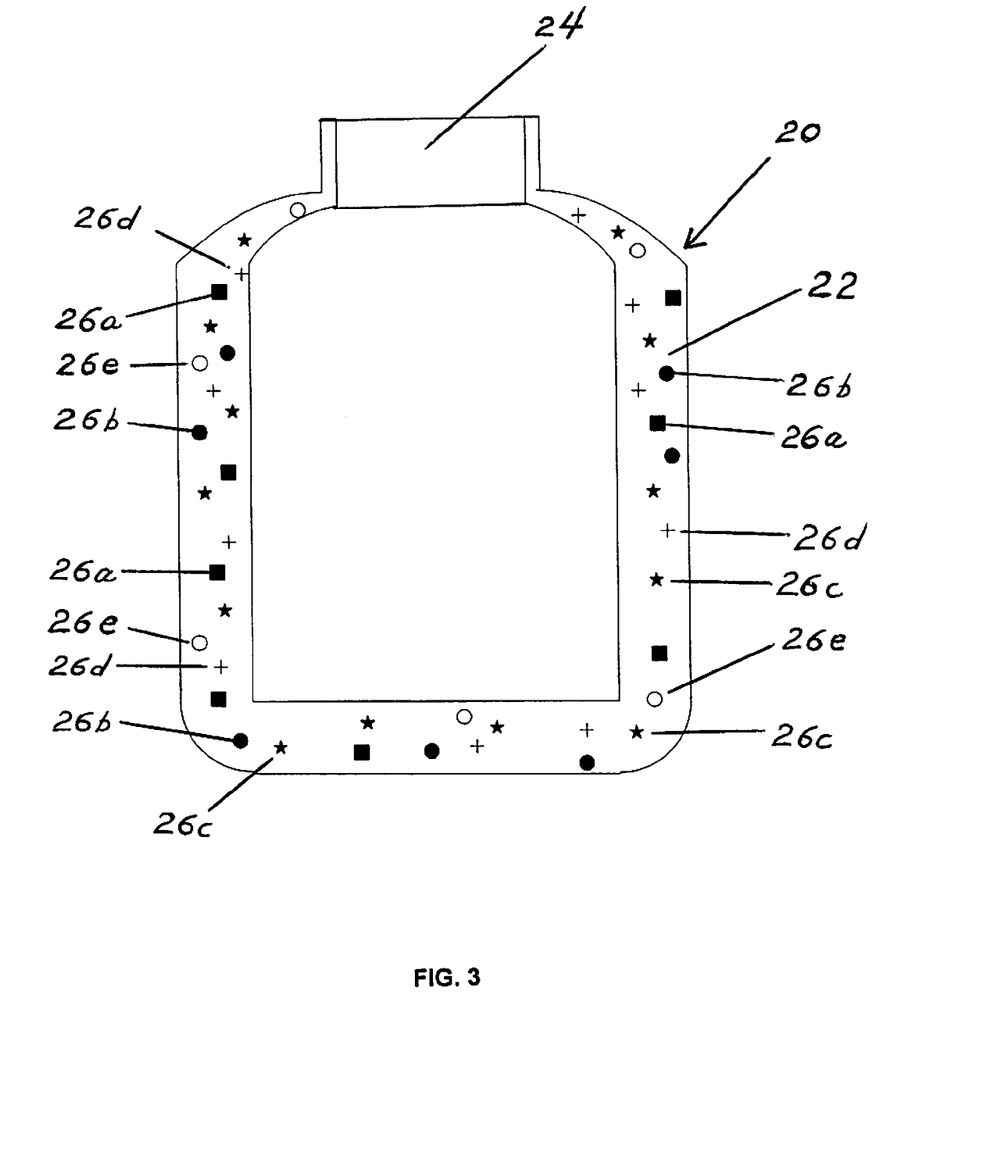
FIG. 3 is a cross-sectional view of the container of FIG. 2 taken along line 3-3.

FIG. 1 shows a radio frequency identification tag 10 having a microchip 12 attached to an antenna 14. The radio frequency identification tag 10 is not a chipless radio frequency identification element. Referring now to FIGS. 2 and 3, a container 20 comprises a body 22 and an opening 24. Embedded in the body 22 is a plurality of categories of chipless radio frequency identification elements 26a, 26b, 26c, 26d, and 26e. Chipless radio frequency identification elements 26a are represented by dark squares. Chipless radio frequency identification elements 26b are represented by dark circles. Chipless radio frequency identification elements 26c are represented by dark stars. Chipless radio frequency identification elements 26d are represented by "+" signs. Chipless radio frequency identification elements 26e are represented by open circles. In FIG. 3, the elements are not actually in the shapes of squares, circles, stars, and "+" signs. These representatives shapes are only intended to indicate that different categories of chipless radio frequency identification elements are employed. In addition, only three of each type of chipless radio frequency identification element are labeled with a reference numeral. As can be seen in FIG. 3, the chipless radio frequency identification elements 26a, 26b, 26c, 26d, and 26e are randomly oriented. Each category of chipless radio frequency identification elements 26a, 26b, 26c, 26d, 26e provides a unique backscattering frequency. Unique blends of the categories of chipless radio frequency identification elements 26a, 26b, 26c, 26d, and 26e can be designed to be used for identification of manufacturing lots and information about the manufacturing lots. It should be noted that more than five (5) categories of chipless radio frequency identification elements can be used.

The chipless radio frequency identification elements 26a, 26b, 26c, 26d, and 26e are resonant elements. A plurality of resonant elements is provided for each object containing chipless radio frequency identification elements 26a, 26b, 26c, 26d, and 26e. Each resonant element is capable of acting as a binary code. If a particular resonant element is used in the object, its value is assigned the digit "1". If that same resonant element is absent from the object, its value is assigned the digit "0". Accordingly, the binary code is assigned based on the presence or absence of a particular resonant element.

Resonant elements are tiny particles with varying degrees of magnetism. These particles have a range of sizes typically in the range of from about 0.1 micrometer to about 10 micrometers. These resonant elements resonate when subjected to electromagnetic waves from a radio frequency reader. Each resonant element emits its own distinct radio frequency. This frequency is picked up by a radio frequency identification reader, and all the frequencies emitted by the specific mix of resonant elements are then interpreted as a binary number. Although the number of types of resonant elements has no upper limit, it is expected that up to, for example, one hundred (100) different types of resonant elements can be used. Because the system can use up to, for example, one hundred (100) different types of resonant elements, each resonant element is assigned its own position in a 100-digit binary number. For example, if the resonant elements A, B, C, D, and E were assigned to the first, second, third, fourth, and fifth positions of a 100-digit number, then a mixture consisting of particles A, C, and D would represent the binary number 10110 followed by 95 zeroes. It should also be noted that a database must be constructed to convert the binary number interpreted above into data for identifying the manufacturing lot(s) of the container(s) and the contents thereof and data for specifying detailed information about the manufacturing lot(s) of the container(s) and the contents thereof. For example, a particular binary number 10110 followed by 95 zeros could indicate that the container associated with that binary number contains a particular reagent; that the reagent has a particular expiration date; that the reagent has a particular active shelf life; that the reagent is provided at a particular volume; that the reagent has a particular origin; that the reagent has a particular maximum storage temperature; and so forth. The database can be in a tabular form, of the type shown below:

| Binary number | Identity of reagent | Expiration date | Shelf life | Volume | Origin | Maximum storage temperature |
| --- | --- | --- | --- | --- | --- | --- |
| | | | | | | |

The resonant elements are distinguishable from one another by their chemical compositions. For example, carbon can be resonant element "A"; silver can be resonant element "B", $BaTiO_3$ can be resonant element "C", and so forth.

Resonant elements suitable for use for preparing the articles described herein include, but are not limited to, ferroelectric materials, such as, for example, $BaTiO_3$, $PbTiO_3$, $NaNbO_3$, conductive materials, such as, for example, carbon, nickel, gold, silver. The material of the resonant element can be in the shape of powder, fiber, flakes, and the like.

Figure 4:
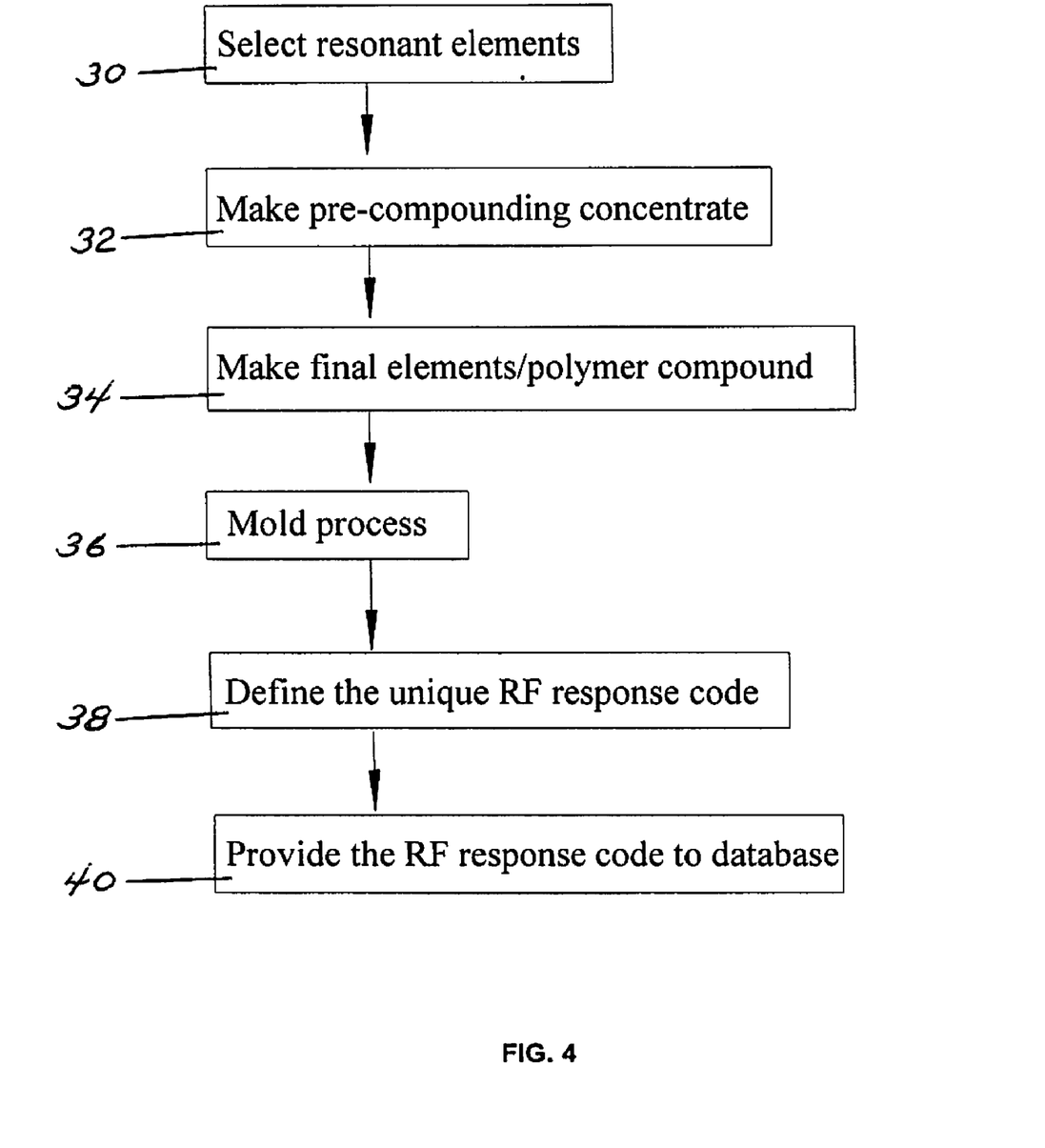
FIG. 4 is a flow chart illustrating a method for preparing the containers described herein.

FIG. 4 is a flow chart illustrating a method for preparing the containers described herein. In general, appropriate resonant elements are selected. See step 30. Then, in a preferred embodiment, a pre-compounding concentrate comprising the resonant elements is prepared. See step 32. Techniques for carrying out this step are well-known to those of ordinary skill in the art. The concentration of the resonant elements in the concentrate is preferred to be at least five (5) times the final concentration decided upon to ensure proper dispersion of the frequency additives in the final molded container. Then, the pre-compounding concentrate is diluted as required to make the final compound of resonant elements and polymeric material. See step 34. As used herein, the term "compound" means produce or create by combining parts; mix. Then, the final compound undergoes a molding process to prepare the molded article. See step 36. A representative example of a molding process is described later. In step 38, a unique radio frequency response code is defined. In step 40, the radio frequency response code is provided to a database.

In order to prepare a molded container in which are embedded chipless radio frequency identification elements, the concentration required for each category of resonant elements is determined. The concentration determined depends on the design of the entire system, including, but not limited to, the weight, dimensions, and shape of the molded container, the layout of the components of the diagnostic instrument, and the design of the radio frequency identification reader. The concentration of resonant elements depends upon the strength of the signal to be received by the radio frequency reader. For example, smaller containers will contain fewer resonant elements than will larger containers; accordingly, the concentration of resonant elements in smaller containers should generally be higher than the concentration of resonant elements in larger containers. The absolute quantity of resonant element in the larger containers would probably exceed the absolute quantity of resonant elements in smaller containers, even when the concentration of resonant elements in smaller containers exceeds the concentration of resonant elements in larger containers. In order to ensure proper dispersion of the resonant elements, it is preferred that pre-compounding concentrates be prepared. In other words, two-step mixing is preferred to assure consistent and proper mixing.

Materials for preparing the body of the molded container include thermoplastics, such as, for example, polyethylenes, polpropylenes, polycarbonates, acrylonitrile-butadiene-styrene (ABS), high impact polystyrene, etc., and thermosetting materials, such as, for example, phenolics, silicones, epoxy, polyurethanes, polyesters, etc.

Figure 5:
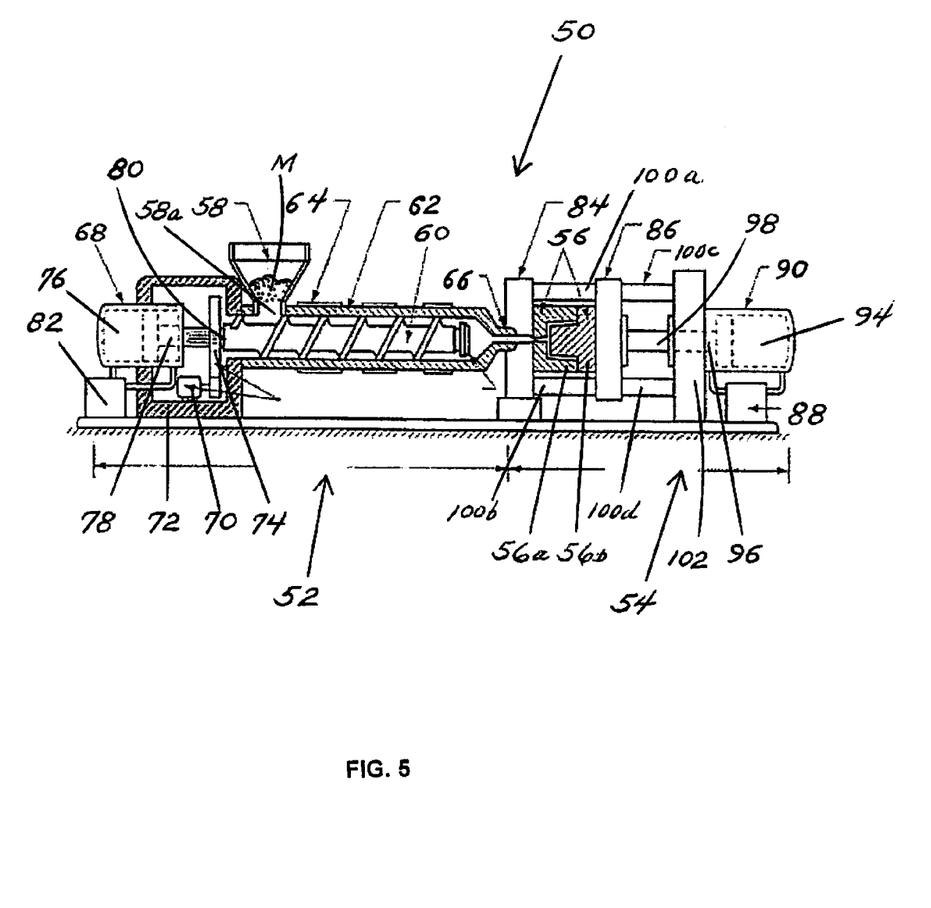
FIG. 5 is a schematic diagram illustrating a molding apparatus suitable for preparing a container described herein.

FIG. 5 illustrates a molding machine that can be adapted for use in a molding process that can be used to prepare the container described herein. An injection-molding machine 50 comprises of two basic parts, an injection unit 52 and a clamping unit 54. Different injection molding machines differ in both injection unit and clamping unit. The name of the injection-molding machine is generally based on the type of injection unit used. The following description is adapted from Injection Molding Machine, [online], [retrieved on 2007-12-13] Retrieved from the Internet: <URL: http://plastics.inwiki.org/Injection_molding_machine>, incorporated herein by reference.

The injection unit 52 melts the polymer or resin and injects the polymeric or resinous melt into the mold 56. The mold 56 comprises a first mold half 56a and a second mold half 56b. The mold 56 can be ram fed or screw fed. An injection ram is a ram or screw that applies pressure on the molten polymeric or resinous material to force the molten material into the cavities of the mold halves 56a, 56b of the mold 56. The reciprocating screw is the most common type of injection ram. The design described herein uses the same barrel for melting and injection of polymer or resin. A feed hopper 58 is a container that holds a supply of molding material "M" to be fed to a reciprocating screw 60. The feed hopper 58 is located over a barrel 62 and a feed throat 58a connects the feed hopper 58 and the barrel 62. An alternative unit (not shown) involves the use of separate barrels for plasticizing and injecting the polymer or resin. This alternative unit is called a screw-preplasticizer machine or two-stage machine. In this alternative unit, polymeric or resinous pellets are fed from the feed hopper into a barrel in a first stage, which uses a screw to drive the polymer or resin forward and melt the polymer or resin.

This barrel in the first stage feeds a barrel in a second stage, which latter barrel uses a plunger to inject the molten polymer or resin into the mold. Older machines used one plunger-driven barrel to melt and inject the polymer or resin. These older machines are referred to as plunger-type injection molding machines. The barrel 62 is a major part that melts polymers or resins transmitted from the feed hopper 58 though screws and is structured in a way that can heat polymers or resins to the proper temperature. A band heater 64, which can control temperature in five sections, is attached outside the barrel 62. Melted polymers or resins are supplied to the mold 56 by passing through the barrel head, shut-off nozzle, and one-touch nozzle 66. A hydraulic motor 70 located inside a bearing box 72 rotates the screw 60, by means of gears 74, and the melted polymers or resins are measured at the nose of the screw 60. There are many types of injection cylinders that supply necessary power to inject polymers or resins, according to the characteristics of the polymers or resins and types of products, at the appropriate speed and pressure. The model shown in FIG. 5 employs the double cylinder type. The injection cylinder 68 comprises a cylinder body 76, a piston 78, and a piston load 80. The injection cylinder 68 is actuated through the aid of a pneumatic or hydraulic energy source 82.

The clamping unit 54 holds the mold halves 56a, 56b of the mold 56 together, opens and closes the mold halves 56a, 56b of the mold 56 automatically, and ejects the finished part from the mold 56. The mechanism of the clamping unit 54 can be of several designs, such as, for example, mechanical, hydraulic, or hydromechanical. There are two main types of injection molds: cold runner (two plate and three plate designs) and hot runner—the more common of the runnerless molds. Injection platens 84, 86 are steel plates on a molding machine to which the mold halves 56a, 56b of the mold 56 are attached. Generally, two platens 84, 86 are used, one platen 84 being stationary and the other platen 86 being movable, actuatable hydraulically by a hydraulic cylinder 88 to open and close the mold 56. The platens 84, 86 provide the positions to mount the mold halves 56a, 56b of the mold 56. The platens 84, 86 contain threaded holes (not shown) on which the mold halves 56a, 56b of the mold 56 can be mounted by using clamps (not shown). A clamping cylinder 90 is a device that effects clamping through the aid of a pneumatic or hydraulic energy source 92. The clamping cylinder 90 has a cylindrical body 94, a piston 96, and a piston load 98. Two tie rods 100a, 100b are located between the stationary platen 84 and the movable platen 86. Two tie rods 100c, 100d are located between the movable platen 86 and the support 102 for the clamping cylinder 90.

The molding or shaping process can also be carded out by such processes as injection molding, compression molding, blow molding, and pultrusion molding.

Operation

Figure 6:
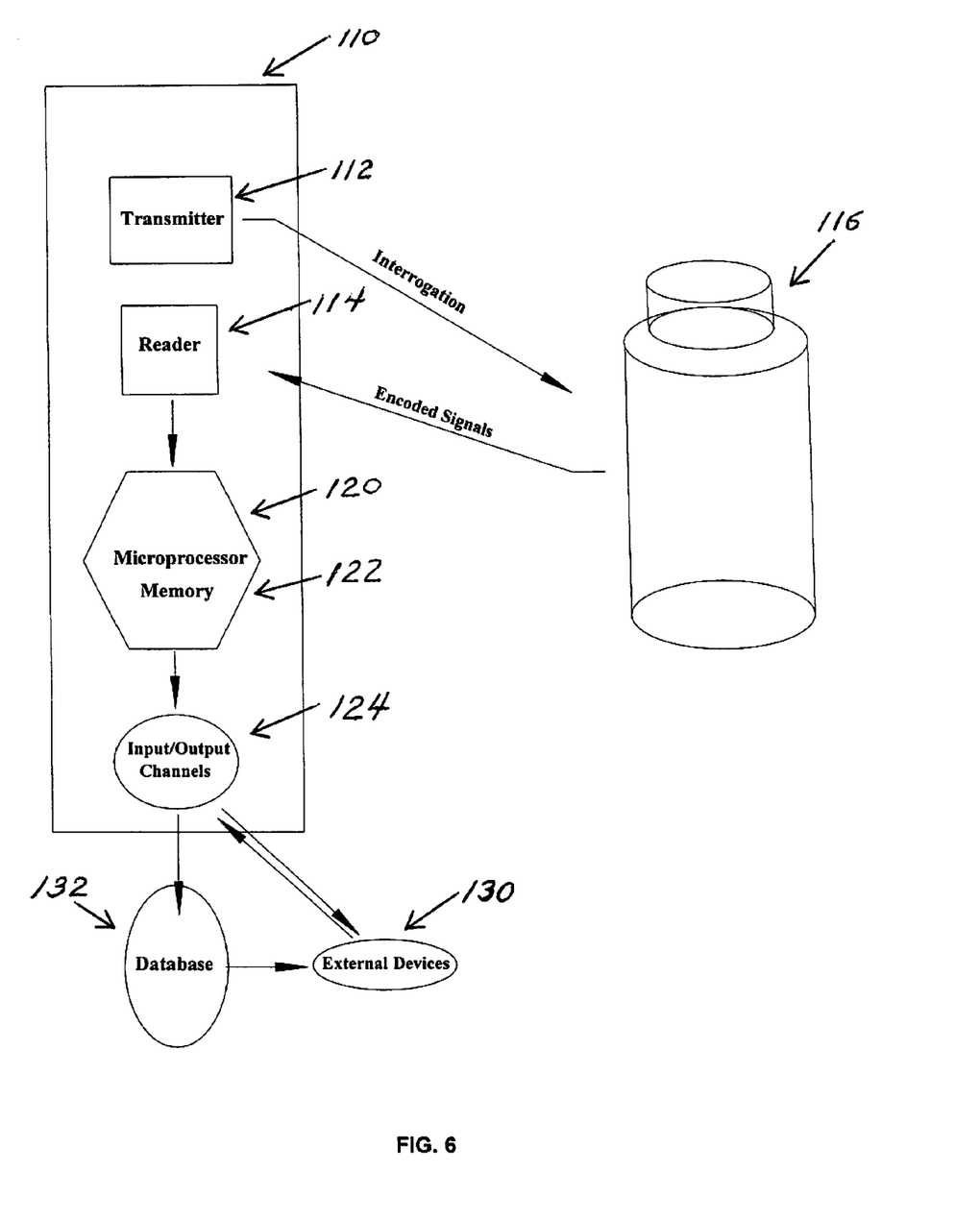
FIG. 6 is a schematic diagram illustrating interrogation and transmitting of signals with a container of the type shown in FIGS. 2 and 3.

Referring now to FIG. 6, a typical radio frequency identification system 110 comprises a transmitter 112 for sending signals from the radio frequency identification system 110 to the surrounding environment, a reader 114 for receiving responses from a container 116, a microprocessor 120 for implementing the protocol of the radio frequency identification system 110 to communicate with the container 116, a memory 122 for storing configuration parameters of the radio frequency identification system 110 and a list of signal reads for the radio frequency identification system 110, input/output channels 124 for controlling devices 130 external to the radio frequency identification reader, such as sensors, actuators, alarms, and a power source (not shown) for supplying power to the radio frequency identification system 110. At least one input/output channel 124 is in communication with a database 132.

Referring again to FIG. 6, the transmitter 112 transmits alternating current signals and clock cycles via its antenna (not shown) to a container 116 responsive to radio frequency identification signals. A pulsed signal is preferred to continuous waves for the reasons that energy is conserved and noise level is reduced. The reader 114 is not required to be operating when no radio frequency identification devices are in the vicinity. Clock intervals for receiving maximum signals are restricted and unwanted noise from the environment is reduced. Clock cycles and clock intervals are described in greater detail in U.S. Pat. No. 4,438,520, incorporated herein by reference. The container 116, which contains a plurality of resonant elements reacts to the radio frequency signals by manifesting absorption, diffraction, or scattering. The reader 114 (or transceiver) picks up the signal(s) returned from the container 116. The signal(s) returned are deconvoluted by chemometrics software programs in the microprocessor 120 to identify the existence of the selected resonant elements. The microprocessor 120 performs error checking and other low-level filtering and sends decoded data in the memory 122 through input/output channels 124 to an external database for recording of information, verification of information, and authentication of information. The external database maintains the pre-selected genetic codes for radio frequency identification devices. When signals sent from the memory 122 of the radio frequency identification system 110 arrives, the information stored in the database will be authenticated, verified, updated, and communicated to trigger other external mechanisms 130, such as, for example, actuators, sensors, alarms.

The system can be operated at a frequency ranging from about 100 KHz to about 10 GHz. It is preferred that the application be operated at low frequencies, such as, for example 125 KHz and 134.2 KHz, and high frequency, such as, for example, 13.56 MHz, on account of the environment in a clinical laboratory, which was explained previously. These frequencies are less sensitive to liquid, dirt, metal than are UHF signals and microwave signals. Other electromagnetic wavelengths should not be excluded, such as for example infrared, ultraviolet, and ultrasonic.

The range of the chipless radio frequency identification element can be up to about one foot. It is preferred that the chipless radio frequency identification element (near field application) be no greater than about 3 inches.

Interference can be reduced by arranging the reader configuration so that only one container is read at a given time. The use of a pulsed signal allows the avoidance of electromagnetic environmental noises.

Data deconvolution processes that can be used to identify the presence of resonant elements in the container include, but are not limited to, least squares regression, multiple linear regression, and principal component analysis.

Figure 7:
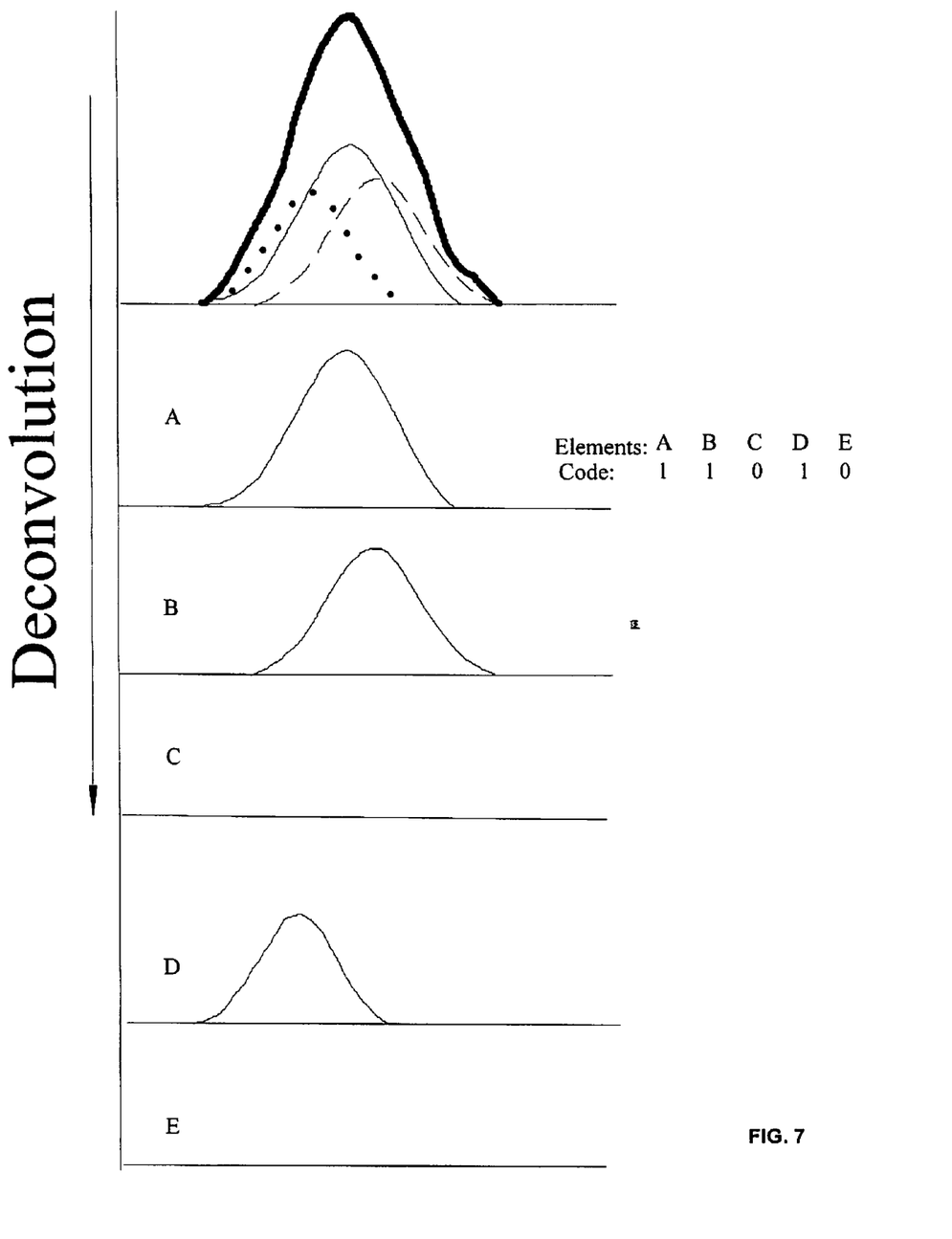
FIG. 7 illustrates responses resulting from the use of the container of the type shown in FIGS. 2 and 3.

The signal responses of mixtures for various concentrations of resonant elements are recorded as reference backgrounds and stored in the memory of the reader. When the actual responses of devices are received, the factor for each type of resonant element can be constructed and resolved for the best matches. The factors can be resolved by principal component analysis, least squares regression, multiple linear regression. If a type of resonant element is absent, the factor will be solved with a value of zero. If a resonant element is present, the value of the factor will not be zero and should be assigned a value of 1. Many commercially available software programs can be used to support these calculations. Representative examples of software calculations suitable for use in deconvolution processes include MATLAB, SAS, MINITAB. FIG. 7 illustrates how a signal is deconvoluted. In this signal, it can be seen that resonant elements C and E are not present in the container. Further information relating to deconvolution can be found in Randall D. Tobias, An Introduction to "Partial Least Squares Regression", SAS Institute Inc., Cary, N.C., pp. 1-8, [online], [retrieved on 2007-12-19] Retrieved from the Internet: <URL: http://support.sas.com/rnd/app/papers/pls.pdf> and James R. Andrews, "Deconvolution of System Impulse Responses and Time Domain Waveforms", Picosecond Pulse Labs, Boulder, Colo. (November 2004), pp. 1-6, both of which are incorporated herein by reference.

The aforementioned chipless radio frequency identification elements can be used with containers for diagnostic reagents, disposable devices for diagnostic assays, and reusable devices for diagnostic assays.

Figure 8:
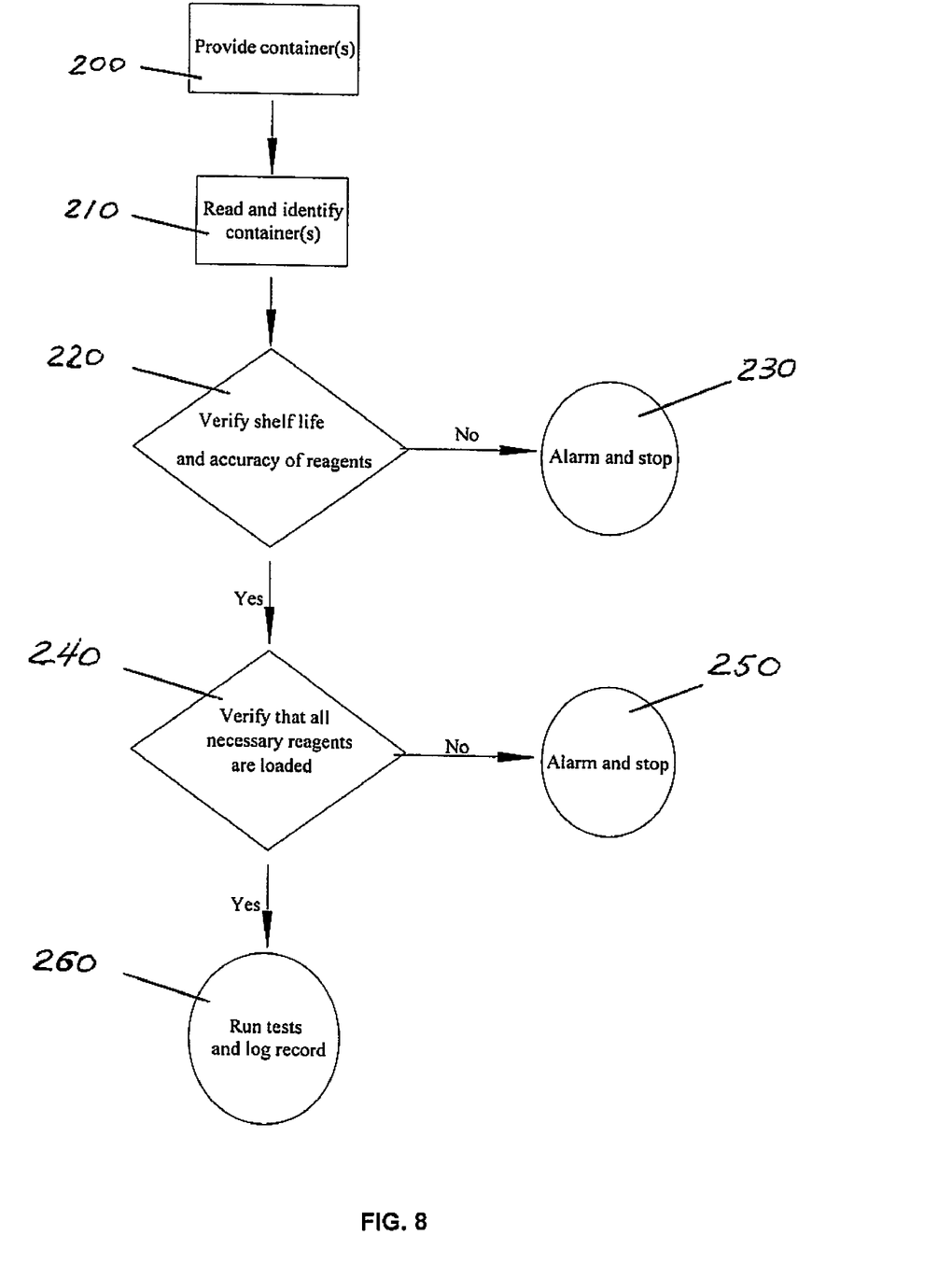
FIG. 8 is a flow chart illustrating a method for utilizing the containers described herein.

FIG. 8 shows a flowchart of a method for identifying a container described herein and verifying information relating to the contents, e.g., laboratory reagents, of a container described herein. At least one container having chipless radio frequency identification elements is provided to a laboratory automation system. See step 200. Information from the at least one container is read in step 210. The reading identifies the container and the contents thereof. Then at least one parameter relating to the contents of the container is verified. Representative examples of such parameters include, but are not limited to, the shelf life and the accuracy of the contents of the container. If the at least one parameter is not verified, e.g., if the shelf life is exceeded or if something about the contents of the container is inaccurate, an alarm will be sent and the process will be stopped. See steps 220 and 230. If the at least one parameter is verified, e.g., if the shelf life is not exceeded and if the contents of the container are accurate, the system can then determine whether all of the reagents necessary for the scheduled laboratory tests are present. See step 240. If fewer than all of the reagents required are present, an alarm will be sent and the process will be stopped. See step 250. If all of the reagents required are present, the laboratory tests will be performed. See step 260. The record of the foregoing process can also be logged. While not illustrated in FIG. 8, it is well-known to those of ordinary skill in the art that the computers and the software needed to operate a laboratory automation system and a laboratory information system must be used to carry out the method shown in FIG. 8 for an automated laboratory.

The present invention provides numerous benefits. Line of sight reading is not necessary. The insertion of chipless radio frequency identification elements is part of the production process for preparing the objects. A plurality of chipless radio frequency identification elements can be read simultaneously. Chipless radio frequency identification elements do not require batteries. The number of combinations provided by chipless radio frequency identification elements can be extremely high, e.g., one hundred (100) binary digits.

All of the polymeric materials and resonant elements described herein are commercially available and well-known to those of ordinary skill in the art. In general, the range of concentrations of chipless radio frequency identification elements to be used in the container described herein depends upon the weight, dimensions, and design of the container, the position of the container relative to the radio frequency identification reader 114, and the design of the radio frequency identification reader 114.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A container comprising a body and an opening, said body having embedded therein a plurality of categories of chipless radio frequency identification elements; wherein each category of radio frequency identification element emits a distinct radio frequency and a combination of frequencies of the plurality of categories of chipless radio frequency identification elements is operable to represent a binary number based on the presence or absence of at least one of the categories of radio frequency identification elements within the container, said container capable of containing a reagent.

2. The container of claim 1, wherein the body is molded from a polymeric composition.

3. The container of claim 1, wherein the plurality of categories of chipless radio frequency identification elements is at least 50 categories.

4. The container of claim 3, wherein the categories of chipless radio frequency identification elements are selected from the group consisting of ferroelectric materials and conductive materials.

5. A method for preparing the container of claim 1, the method comprising the steps of:
   (a) providing a polymeric composition that is capable of being molded into the form of a container comprising a body and an opening;
   (b) introducing a plurality of categories of chipless radio frequency identification elements into said polymeric composition to form a polymeric composition containing a plurality of categories of chipless radio frequency identification elements; wherein each category of chipless radio frequency elements emits a distinct radio frequency and a combination of frequencies of the plurality of categories of chipless radio frequency elements is operable to represent a binary number based on the presence or absence of at least one of the categories of chipless radio frequency elements within the container; and
   (c) molding said polymeric composition containing said plurality of categories of chipless radio frequency identification elements to form the body of the container.

6. The method of claim 5, wherein the plurality of categories of chipless radio frequency identification elements and the polymeric composition are pre-compounded prior to the final compounding of the plurality of categories of chipless radio frequency identification elements and the polymeric composition.

7. The method of claim 5, wherein a radio frequency response code is defined.

8. The method of claim 7, wherein the radio frequency response code is provided to a database.

* * * * *